Dec. 29, 1942.   E. H. SIMONSEN ET AL   2,306,506
SHEARS
Filed Feb. 28, 1941
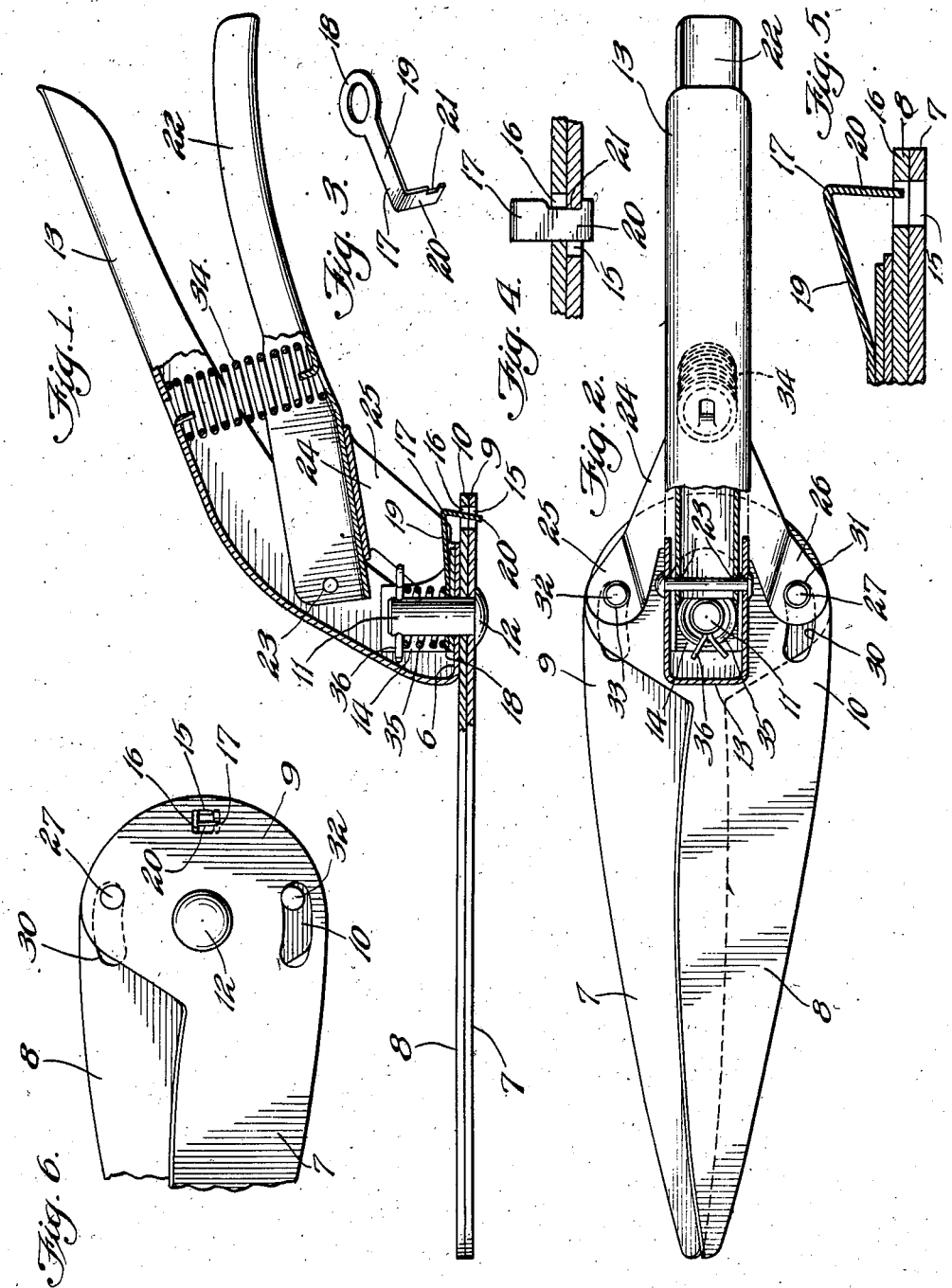
INVENTORS.
Edward H. Simonsen
BY Herbert C. Berry
Glenn S. Noble ATTORNEY.

Patented Dec. 29, 1942

2,306,506

UNITED STATES PATENT OFFICE 2,306,506

SHEARS

Edward H. Simonsen and Herbert C. Berry, Chicago, Ill.

Application February 28, 1941, Serial No. 380,968

4 Claims. (Cl. 30—248)

This invention pertains to shears of the type more or less commonly known as grass shears in which the handle members operate in a plane at right angles to the blades.

The objects of the invention are to provide certain improvements in such shears, and more particularly in the details of construction and locking means for fastening the blades in closed position; to provide an improved catch which coacts directly with the blades for holding them closed; to provide an improved mounting for the blades, and to provide such other desirable features as will appear more fully hereinafter.

In the accompanying drawing illustrating this invention,

Fig. 1 is a longitudinal sectional view;

Fig. 2 is a plan view with parts broken away or shown in section for convenience in illustration;

Fig. 3 is a perspective view of the blade catch;

Fig. 4 is a sectional detail showing the catch in fastening position;

Fig. 5 is a detail showing the position of the end of the catch when in releasing position; and Fig. 6 is a bottom plan detail of the pivoted portions of the blades.

The blades 7 and 8 are made with narrow cutting portions and have enlarged pivotal or bearing end portions 9 and 10, these enlarged portions serving to give ample support to the blades and to guide them in their cutting movements. The blades are mounted on a stud or pivot pin 11, having a head 12 and extending up through holes in the bearing enlargements 9 and 10 as shown. The stud 11 also passes through a plate or bearing 6 forming a portion of the lower end with a handle 13. This handle is preferably made of sheet metal and made substantially channel-shape in cross section as shown. The lower end of the handle is strengthened and stiffened by an auxiliary bearing member or bracket 14, the sides of which are spot-welded to the handle, and the lower portion having a hole for receiving the stud 11. The rear ends of the blades have rectangular holes or openings 15 and 16 which are in alignment or coincide when the blades are in closed position. The blades may be held in closed position by means of a spring catch 17, one end 18 of which is of annular or washer form and fits over the stud 11 as shown in Fig. 1. The catch or detent has a tongue portion 19 which extends rearwardly and is bent at substantially right angles at the outer end to form a tip 20 which is adapted to engage with the holes 15 and 16. The catch is formed so that the tip portion normally extends through the hole 16 in the upper blade 8 whereby the catch will swing on the stud 11 when the blades are actuated, but will not enter the hole 15 in the lower blade. The tip or end 20 is also preferably provided with a notch 21 for engagement with the edges of the hole 15 to hold the catch in fastening position.

A second handle 22 is pivotally connected at 23 to the handle 13, this handle also being preferably made of sheet metal and of channel-shape as indicated. A bracket 24 is secured to the handle 22 adjacent to the pivot as by spot-welding, and has outwardly and downwardly extending arms 25 and 26 which embrace the lower end of the first named handle member. A pin or rivet 27 is fastened in the outer periphery of the bearing portion 9 of the blade 7 and extends up through a slot 30 in the blade 8 and through a hole or bearing 31 in the arm 26. Another similar pin or rivet 32 is secured to the enlarged portion 10 of the blade 8 and extends up through a hole 33 in the arm 25, these pins coacting with the handle members for swinging the blades. A spring 34 is interposted between the handle members 13 and 22 and tends to urge them apart and consequently to swing the blades to open position as will be readily understood. Another spring 35 circles the stud 11 with its lower end engaging with the annular portion of the catch 17 and its upper end engaging with a cotter pin or abutment 36 at the upper end of the stud and serves to hold the parts mounted on the stud yieldingly together as will appear from Fig. 1.

When the blades are to be fastened in closed position, the handle members are squeezed together and the operator presses down on the outer end of the catch 17 which presses the tip 20 through the hole 15 to engage with the lower blade as illustrated in Fig. 4. When the tip is pressed down into such position, the handles are released so that the blades are swung under the action of the spring 34 until the edge of the hole 15 enters the notch 21 which will hold the end of the catch downwardly in engaging position in which position it will prevent the swinging of the blades. When the catch is to be released, the handles are pressed together which causes the hole 15 to register with the hole 16 and permits the end of the catch to spring up to its normal or disengaging position in which the blades are free to be operated in the usual manner.

We are aware that it has heretofore been proposed to provide a catch for shears of this type for locking the handles in position with the blades closed, but such catch means coacting with the handles is not entirely satisfactory as the handles may become sprung or bent and the catch is not as positive as when it engages directly with the blades as in the present construction.

Having thus described our invention, what we claim is:

1. In a grass shears, the combination of a pair of handle members, blades operatively connected with said members and having openings which register when the blades are in closed position, spring means cooperating with the handle members tending to swing the blades to open position, means for holding the blades in closed position comprising a catch member which projects through said openings in the blades to hold them in closed position, said catch member being held in fastening position by the tension on the blades and means for retracting said catch member to disengage it from said holding position when the tension is relieved.

2. Shears including a main handle member, blades pivotally mounted on said handle member, a second handle member pivoted to the first member and operatively connected with the blades for swinging the same, a spring between said handle members tending to move them to open position, a catch comprising a spring having a washer portion engaging with the pivot for the blades, and a tongue portion extending rearwardly and bent toward the blades to provide a fastening tip, said tip normally projecting through a recess in the top blade and adapted to engage with a recess in the lower blade when said recesses are in alignment, said tip having a notch in the side for engagement with the lower blade to hold the tip in engaging position, said tip being adapted to be released when the tension of the blades on the tip is released.

3. The combination with a pair of grass shears having pivoted handles and having means tending to hold the handles in open position, and having blades pivotally connected with said handles, of a resilient catch mounted on the pivot for the blades and having a portion adapted to engage with openings in the blades for holding them in closed position, said catch being maintained in fastening position by the tension of the blades thereon and being adapted to be released when the handles are moved to free the same from the blades.

4. In a pair of shears of the character set forth, the combination of a handle, a substantially U-shaped bracket secured to said handle, a pair of blades, a stud extending through said blades and said bracket, a spring mounted on said stud with one end engaging with the bracket, an abutment on the stud engaging with the opposite end of the spring whereby the spring will draw the blades toward the bracket, a second handle pivoted to the first handle adjacent to the bracket, and having outwardly extending arms, pivot pins secured to the respective blades and engaging with the arms for actuating the blades, and a compression spring between the handles tending to move the handles and blades to open position.

EDWARD H. SIMONSEN.
HERBERT C. BERRY.